E. H. FOLEY.
SOUND TRANSMITTING APPARATUS.
APPLICATION FILED AUG. 19, 1915.
1,396,178.
Patented Nov. 8, 1921.
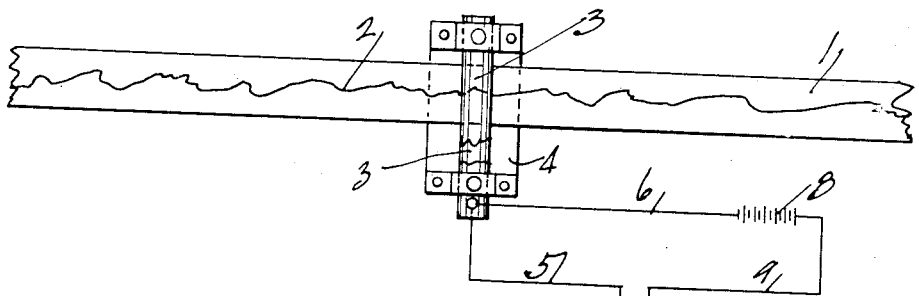
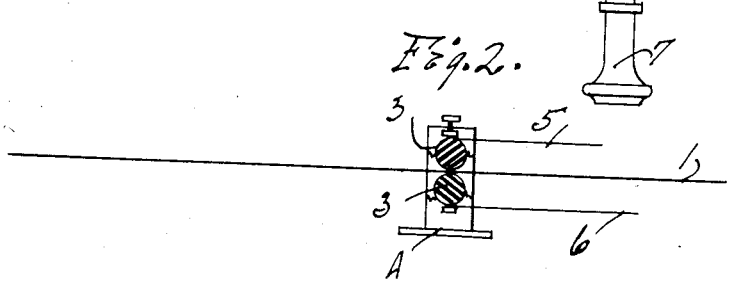
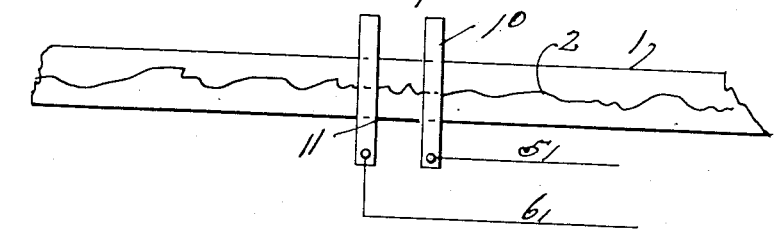
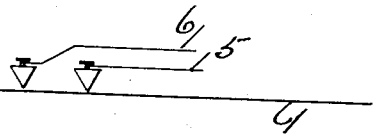

UNITED STATES PATENT OFFICE.

EARL H. FOLEY, OF SEATTLE, WASHINGTON.

SOUND-TRANSMITTING APPARATUS.

1,396,178.

Specification of Letters Patent.   Patented Nov. 8, 1921.

Application filed August 19, 1915. Serial No. 46,235.

(GRANTED UNDER THE PROVISIONS OF THE ACT OF MARCH 3, 1921. 41 STAT. L., 1313.)

*To all whom it may concern:*

Be it known that I, EARL H. FOLEY, a citizen of the United States, and a resident of Seattle, in the county of King and State of Washington, have invented certain new and useful Improvements in Sound-Transmitting Apparatus, of which the following is a full, true, and exact specification.

My invention relates to sound transmitting apparatus and has for its principal object to provide a novel means for transmitting sound waves from a record which consists of a continuous strip of paper upon which a sound wave has been recorded in the form of a line of current conducting material. The record may be made by any one of a number of processes as the photographic, oscillograph or by using a current conducting material for making the graph on a strip of paper. A further object is to provide a device which will be applicable for use in connection with graphs of words as in a graph record dictionary, whereby the dictionary graphs would be pronounced by passing my device over the word graph.

Other objects will appear as my invention is more fully explained in the following specification, illustrated in the accompanying drawings and pointed out in the appended claims.

Referring to the drawings, Figure 1 is a plan view of my device with a strip of record in operative position. Fig. 2 is an elevation of same. Figs. 3 and 4 are corresponding views of an alternate form of my device.

Referring more particularly to Figs. 1 and 2, numeral 1 indicates a strip of record upon which the graph 2 of a sound wave has been recorded in the form of a line of current conducting substance. The record is passed between two closely spaced carbon cylinders 3 which may be adjustably mounted in a frame 4. Wires 5 and 6 lead one from each of the carbon cylinders to a receiver 7 and a battery 8 respectively. Wire 9 connects the battery and receiver into a circuit.

The operation of my device is as follows: The current flows out one carbon cylinder and crosses through that part of the graph nearest to the other carbon cylinder and back through the receiver of the battery. The resistance in the circuit is varied as the conducting portion of the graph is nearer to or farther from the connection ends of the carbon cylinders and therefore the strength of current actuating a diaphragm in the receiver 7 is automatically varied as the graph moves through the cylinder.

Referring to Figs. 3 and 4, similar numbers will be used as in Figs. 1 and 2 for the record and the wiring diagram is similar to Figs. 1 and 2. The resistances consist of a conductor 10 of a minimum resistance and a high resistance conductor 11 arranged in a parallel position on the same side of the record. The operation is similar to Figs. 1 and 2, the current being varied by the movement of the point of connection between the graph and the high resistances 11. The devices described are cheap, novel and capable of using a cheap form of record which is compact in form and easily fed to the transmitter apparatus.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

In a device of the class described, the combination of a continuous flexible record having a current conducting graph of sound waves upon it and means for reproducing the said sound waves from the record, said means including a current conductor of minimum resistance and one of high resistance arranged in parallel positions adjacent one side of said graph, a high resistance receiver, a source of current, connections between said conductors and source, the said source being connected in closed relation with said receiver by the current conducting graph, whereby the intensity of the current is varied by the changing position of the graph line.

EARL H. FOLEY.